United States Patent Office 3,054,577
Patented Sept. 18, 1962

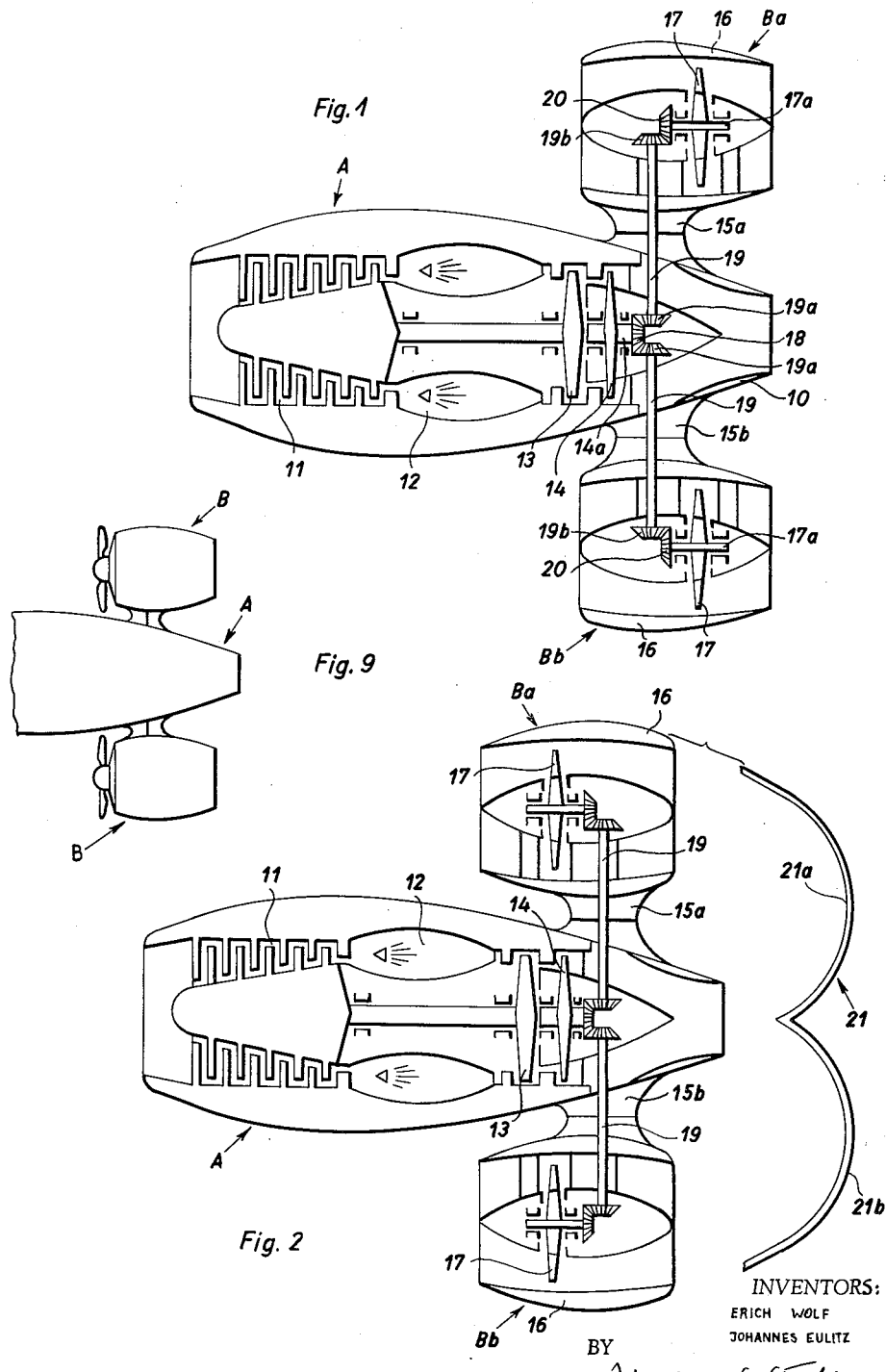

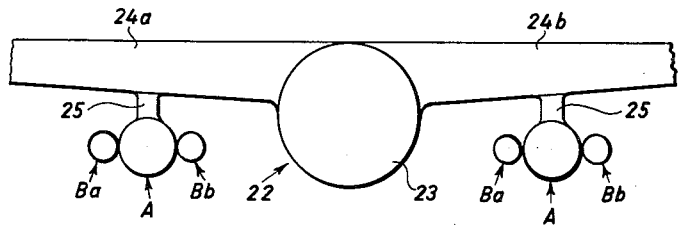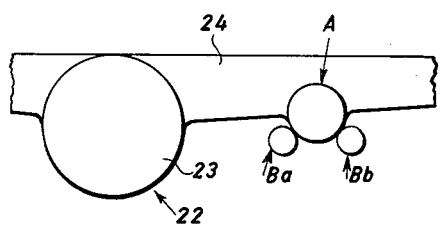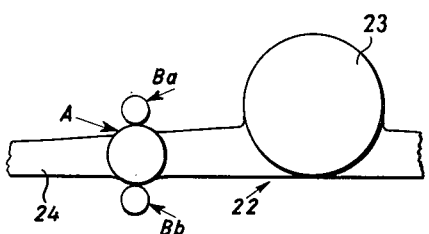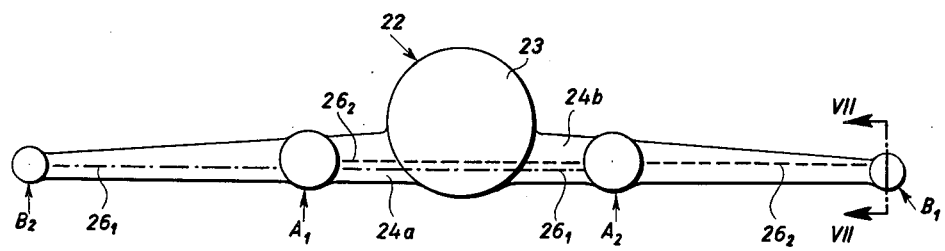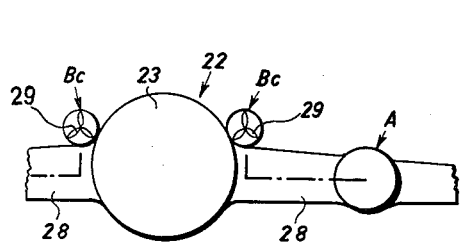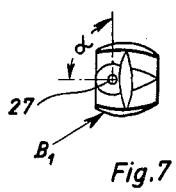

3,054,577
POWER PLANT FOR JET PROPELLED AIRCRAFT
Erich Wolf and Johannes Eulitz, Dresden, Germany, assignors to Forschungszentrums der Luftfahrtindustrie, Dresden, Germany
Filed Feb. 27, 1961, Ser. No. 91,823
2 Claims. (Cl. 244—15)

The present invention relates to jet propelled aircraft in general, and more particularly to improvements in power plants for such aircraft.

It is already known to provide a jet propulsion power plant with a so-called turbo fan. Such turbo fans are divided into front fans and aft fans. A front fan comprises an auxiliary compressor or fan which is provided in front of or above and usually derives motion from the main compressor. An aft fan is driven by the turbine and comprises blades which usually form a unit with and extend radially beyond the turbine blades. The disadvantage of both such types of turbo fans is that they unduly increase the dimensions of the jet propulsion power plants. The diameter of the power plant is invariably increased in its forward zone (front fan) or in its rear zone (aft fan) which renders it practically impossible to install such power plants in certain types of aircraft. Furthermore, the cold fluid stream produced by a front or aft fan is admixed to the hot exhaust jet of the power plant though it is often desirable to discharge the cold stream in one or more separate paths, particularly if the power plant is equipped with a variable-area orifice which should not be subjected to the direct action of hot exhaust gases. The separation of a cold stream produced by the turbo fan from a hot exhaust jet produced by the power plant is very difficult or plain impossible.

Accordingly, it is an important object of the present invention to provide a jet propulsion power plant which is equipped with one or more auxiliary compressors or fans and wherein the fans are arranged in such a way that the dimensions of the main power plant need not be or are increased to a very small extent.

Another object of the invention is to provide a jet propulsion power plant of the just outlined characterstics which is constructed and assembled in such a way that its radial dimensions remain unchanged even though it operates two or even more fans.

A further object of the instant invention is to provide a jet propulsion power plant of the above outlined type wherein one or more fluid streams produced by the fan or fans need not be admixed to and are controllable independently of the main exhaust jet.

An additional object of the invention is to provide a system for propelling a jet powered aircraft which comprises one or more power plants and one or more fans for each power plant, and wherein the fans increase the thrust and simultaneously reduce the noise of the aircraft.

A concomitant object of the present invention is to provide a system of the just outlined characteristics wherein the fans contribute to uniform distribution of moments about the vertical axis of the aircraft.

Still another object of the invention is to provide a system of the above outlined type wherein the fluid streams produced by the fans may be utilized for assisting the pilot in maneuvering the aircraft, particularly during landing and takeoff, and wherein the fans are entirely independent of the main compressor and/or turbine of the respective power plant.

A further object of the invention is to provide a power plant for jet propelled aircraft and the like wherein the fans may be utilized for completely reversing the direction of and for accelerating the exhaust jet produced by the power plant.

With the above objects in view, the invention resides in the provision of a system for propelling a jet aircraft which comprises a jet power plant, e.g. a turbojet engine, and one or more fans each of which comprises a fluid stream producing means in the form of a bladed rotor or propeller and each of which is driven by a turbine of the power plant. It is preferred to provide in the power plant an auxiliary turbine which is located rearwardly of but need not be connected to the main turbine. The fan or fans are external to and may be carried by a rear, median or forward portion of the power plant, they may be spaced from the power plant and mounted independently in the wings of an aircraft, or they may be mounted on the fuselage of the aircraft. The auxiliary turbine as well as the bladed rotors of the fans may comprise one or more stages.

Another important feature of the invention resides in such mounting of the fans that they may be rotated about an axis which is substantially perpendicular to the longitudinal axis of the power plant. This renders it possible to completely reverse the exhaust jet of the power plant by placing a suitable obstruction rearwardly of the exhaust nozzle and by turning the fan or fans through full 180 degrees. If the fans are turned through less than 180 degrees, the streams which they produce may be utilized for assisting the climb or the descent of a jet propelled aircraft.

According to another important feature of the invention, a power plant may be mounted on one wing and the associated fan or fans are then mounted on the other wing so as to equalize the moments about the vertical axis of the aircraft in the event that one of the main power plants is out of commission.

The novel features which are considered as characteristic of the invention are set forth in particular in the appended claims. The invention itself, however, both as to its construction and its method of operation, together with additional objects and advantages thereof, will be best understood from the following detailed description of certain specific embodiments when read in connection with the accompanying drawings, in which:

FIG. 1 is a schematic axial section through a jet power plant and through two symmetrically arranged fans which are connected to and are operated by a separate turbine provided in the jet power plant;

FIG. 2 is a similar axial section showing the fans turned through 180 degrees and further showing a thrust reverser in the form of two hemispherical obstructions;

FIG. 3 is a somewhat schematic front elevational view of an aircraft with a system of the type shown FIGS. 1 and 2 mounted on each wing;

FIG. 4 is a somewhat schematic fragmentary front elevational view of an aircraft whose wing carries a jet power plant and two differently mounted fans;

FIG. 5 is a further fragmentary front elevational view of an aircraft whose wing carries a jet power plant and two vertically spaced fans;

FIG. 6 is an additional fragmentary front elevational view of an aircraft wherein the wing supports a jet power plant and a fan which is spaced from the power plant;

FIG. 7 is a fragmentary section taken along the line VII—VII of FIG. 6, as seen in the direction of arrows;

FIG. 8 is a fragmentary front elevational view of an aircraft wherein each power plant is associated with a single fan and wherein the fans are supported by the fuselage; and FIG. 9 is a schematic elevational view of a power plant end of two fans which are equipped with propellers and which are mounted forwardly of the exhaust nozzle of the power plant.

Referring now in greater detail to the drawings, and first to FIG. 1, there is shown a system for propelling an aircraft which comprises a jet power plant A and two fans $Ba$, and $Bb$ which are supported by and are laterally adjacent to the rear end of the exhaust nozzle 10 forming the rearmost part of the power plant A. The latter is shown in the form of a turbojet engine which comprises an axial compressor 11, a combustion chamber 12, a main turbine 13 which is drivingly connected with the compressor 11, and a second or auxiliary turbine 14 which is independent of and is located rearwardly of the main turbine. The exact construction of the power plant A, with the exception of the provision of a second turbine 14, forms no part of the present invention. It is equally possible to utilize a power plant with a centrifugal compressor and with a multi-stage main turbine. The second turbine 14 may but need not necessarily comprise two or more stages.

The fans $Ba$, $Bb$ are secured to the power plant A by suitable connecting means $15a$, $15b$ in such a way that they may be pivoted through 180 degrees about an axis which is perpendicular to the longitudinal axis of the power plant. Each fan comprises a tubular housing 16 with an open intake end and an open discharge end, and an internally mounted fluid stream producing means in the form of a bladed rotor 17 which is driven by the second turbine 14 through a step-up or step-down transmission here shown as comprising a bevel gear 18 which is coaxially connected to the rear end of the turbine rotor shaft $14a$, a second bevel gear $19a$ which meshes with the gear 18 and is connected to the inner end of a connecting shaft 19, a third bevel gear $19b$ which is connected to the outer end of the shaft 19, and a fourth bevel gear 20 which meshes with the gear $19b$ and is connected to the forward end of the rotor shaft $17a$. The connecting shaft 19 is shown as but need not be exactly perpendicular to the rotor shafts $14a$, $17a$.

The system of FIG. 1 operates as follows:

The auxiliary turbine 14 is rotated by and withdraws energy from the exhaust jet produced by the main turbine 13. This reduces the speed of the exhaust jet discharged rearwardly through the nozzle 10 by simultaneous reduction of the noise. The energy withdrawn from the exhaust jet by the auxiliary turbine 14 is utilized for driving the bladed rotors 17 of the fans $Ba$, $Bb$ which accelerate additional masses of air to form two cold fluid streams and to thereby add to the thrust of the power plant. This is particularly advantageous during takeoff of the jet propelled aircraft. The reduction in noise is due to a reduction in the velocity of the exhaust jet emanating from the nozzle 10. It will be seen that the composite jet produced by the system of FIG. 1 consists of a hot exhaust jet discharged through the nozzle 10 and of two cold streams produced by the fans $Ba$, $Bb$.

FIG. 2 illustrates the system of FIG. 1 with the fans $Ba$, $Bb$ turned through 180 degrees about the common axis of the connecting shafts 19 which is perpendicular to the longitudinal axis of the power plant A. In addition, the system comprises a removably installed twin obstruction 21 which comprises two hemispherical thrust reversing members $21a$, $21b$ adapted to deflect the main exhaust jet discharged through the nozzle 10 into the intake ends of the fans $Ba$, $Bb$. When the fans $Ba$, $Bb$ assume the position of FIG. 2, they may be utilized for braking the aircraft preliminary to and during actual landing. Furthermore, by turning the fans $Ba$, $Bb$ through less than 180 degrees, the pilot may utilize the same for proper maneuvering of the aircraft, i.e. for climbing, descending, turning, etc. The exhaust jet discharged by the nozzle 10 is completely reversed by the obstruction 21 and is divided into two separate streams which are accelerated during their passage through the fans $Ba$, $Bb$. When the thrust reversing obstruction is removed from the path of the exhaust jet and the fans $Ba$, $Bb$ are turned through up to 90 degrees so that their discharge ends point in downward direction, they produce an upward thrust which assists the climb of the aircraft. Inversely, when the fans are turned through an angle of up to 90 degrees in such a way that their discharge ends point in upward direction, they assist the descent of the aircraft.

FIG. 3 illustrates a jet propelled aircraft 22 whose fuselage 23 supports a pair of wings $24a$, $24b$, and each of these wings supports a system of the type shown in FIG. 1 or 2 including a power plant A and two symmetrically disposed fans $Ba$, $Bb$. It will be seen that the axes of the fans are disposed in a common horizontal plane with the axes of the respective power plants, i.e. that the fans are located diametrically opposite each other with respect to the axis of the respective power plant. The pod-mounted power plants A are carried by support struts 25.

FIG. 4 illustrates a somewhat modified system whose power plant A is built into the wing 24. The fans $Ba$, $Bb$ are again connected to the power plant but are not diametrically opposite each other, i.e. they are disposed symmetrically with respect to a vertical plane passing through the axis of the power plant but at a level below the latter's axis.

Iu FIG. 5, the power plant A is again built into the wing 24, but the two fans $Ba$, $Bb$ are vertically spaced from each other, i.e. the axes of the power plant A and of the fans $Ba$, $Bb$ are located in a common vertical plane.

Referring now to FIG. 6, there is shown an aircraft 22 comprising two wings $24a$, $24b$ each of which respectively supports a power plant $A_1$, $A_2$ and a single fan $B_2$, $B_1$. The driving connection between the power plant $A_1$ on the right-hand wing $24a$ and the fan $B_1$ at the tip of the left-hand wing $24b$ is schematically indicated by a phantom line $26_1$. A broken line $26_2$ indicates schematically the driving connection between the power plant $A_2$ on the left-hand wing $24b$ and the fan $B_2$ which is mounted at the tip of the right-hand wing $24a$. Each of the fans $B_1$, $B_2$ is pivotable about a horizontal axis 27 which is perpendicular to the axes of the power plants $A_1$, $A_2$. The fans $B_1$, $B_2$ are particularly suited for assisting the climb of the aircraft 22 if they are turned through a fraction of or through the full angle $\alpha$ which is shown in FIG. 7 so that their discharge ends point in downward direction.

Another important advantage of the system shown in FIG. 6 is that it insures an equalization of moments abut the vertical axis of the aircraft 22 when only the one or only the other of the power plants $A_1$, $A_2$ is in operation. For example, if the power plant $A_1$ is defective and the aircraft 22 is compelled to continue its flight with the power plant $A_2$, the provision of the fan $B_2$ on the wing $24a$, insures that the moments about the vertical axis of the aircraft are fully or at least partially equalized.

FIG. 8 illustrates an additional embodiment of the invention according to which each of the power plants A (only one shown) is associated with a single fan $Bc$, and the latter are secured to the fuselage 23 of the aircraft 22. The connection between the power plant A and the respective fan $Bc$ is shown schematically by phantom lines 28. It will be noted that the fans are equipped with different stream producing means in the form of propellers 29. Thus, it will be seen that each power plant may be associated with one or more fans and that it is not necessary that the fans be directly connected with the respective power plants, i.e. the power plants may be secured to the wings while the fans are carried by the fuselage, or vice versa. Furthermore, and as shown in FIG. 9, the fan or fans B need not be connected to the tail portion but may be connected to another, e.g. central, peripheral portion of the respective power plant A. It is assumed that the fans B are provided with propellers.

It will be readily understood that it is not absolutely necessary to provide a separate transmission for each fan which is associated with a power plant. Thus, and referring to FIG. 1, it is equally possible to provide a step-up or step-down transmission or other driving means between the auxiliary turbine 14 and the fan B*a*, and to provide a direct driving connection between the fan B*a* and the other fan B*b*.

Without further analysis, the foregoing will so fully reveal the gist of the present invention that others can, by applying current knowledge, readily adapt it for various applications without omitting features that, from the standpoint of prior art, fairly constitute essential characteristics of the generic, and specific aspects of this invention and, therefore, such adaptations should and are intended to be comprehended within the meaning and range of equivalence of the following claims.

What is claimed as new and desired to be secured by Letters Patent is:

1. In a jet propelled aircraft, in combination, at least one jet power plant comprising a main turbine for producing an exhaust jet and at least one auxiliary turbine provided rearwardly of said main turbine and driven by said jet; at least one fan externally connected to said power plant and pivotable through 180 degrees about an axis perpendicular to the axis of said power plant; means for drivingly connecting said auxiliary turbine with said fan; and means located rearwardly of said power plant for deflecting the jet into said fan.

2. In a jet propelled aircraft, in combination, at least one jet power plant comprising a main turbine for producing an exhaust jet and at least one auxiliary turbine provided rearwardly of said main turbine and driven by said jet; a pair of symmetrically arranged fans externally connected to said power plant and each pivotable through 180 degrees about an axis perpendicular to the axis of said power plant; means for drivingly connecting said auxiliary turbine with said fans; and means located rearwardly of said power plant for dividing the jet into two separate streams and for deflecting each stream into one of said fans.

References Cited in the file of this patent

UNITED STATES PATENTS

| | | |
|---|---|---|
| 2,450,821 | Zimmerman | Oct. 5, 1948 |
| 2,961,189 | Doak | Nov. 22, 1960 |
| 2,991,618 | Marscher | July 11, 1961 |

FOREIGN PATENTS

| | | |
|---|---|---|
| 1,210,698 | France | Oct. 5, 1959 |